United States Patent [19]

Meinert et al.

[11] Patent Number: 5,068,209
[45] Date of Patent: Nov. 26, 1991

[54] OPTICAL FLUOROPHOSPHATE GLASS WITH ANOMALOUS POSITIVE INCREMENTAL DISPERSION AND PROCESS FOR MAKING IT

[75] Inventors: Norbert Meinert, Solms-Albshausen; Dieter Gelzenleuchter, Wetzlar; Henning Franek, Braunfels-Tiefenbach, all of Fed. Rep. of Germany

[73] Assignee: Wild Leitz GmbH, Wetzlar, Fed. Rep. of Germany

[21] Appl. No.: 466,287

[22] PCT Filed: Jun. 24, 1989

[86] PCT No.: PCT/DE89/00422
  § 371 Date: Apr. 10, 1990
  § 102(e) Date: Apr. 10, 1990

[87] PCT Pub. No.: WO90/00159
  PCT Pub. Date: Jan. 11, 1990

[30] Foreign Application Priority Data

Jun. 29, 1988 [DE] Fed. Rep. of Germany ....... 3821859

[51] Int. Cl.$^5$ .................... C03C 6/06; C03C 3/247
[52] U.S. Cl. ........................... 501/30; 501/44
[58] Field of Search .................... 501/30, 44

[56] References Cited

U.S. PATENT DOCUMENTS

| | | | |
|---|---|---|---|
| 3,451,829 | 6/1969 | Bromer et al. | 501/44 |
| 3,492,136 | 1/1970 | Bromer et al. | 501/44 |
| 3,671,276 | 6/1972 | Bromer et al. | 501/44 |
| 4,859,635 | 8/1989 | Meinert et al. | 501/44 |

FOREIGN PATENT DOCUMENTS

| | | |
|---|---|---|
| 1496563 | 7/1969 | Fed. Rep. of Germany . |
| 1496566 | 9/1969 | Fed. Rep. of Germany . |
| 2011703 | 3/1970 | France . |

*Primary Examiner*—William R. Dixon, Jr.
*Assistant Examiner*—Lea M. Schull
*Attorney, Agent, or Firm*—Foley & Lardner

[57] ABSTRACT

An optical fluorophosphate glass with an anomalous positive incremental dispersion $+\Delta\nu_e$ between 11.8 and 12.5, a refractive index $n_e$ between 1.53 and 1.55 and an Abbe coefficient $\nu_e$ between 72.8 and 73.5 has the following atomic composition (in atom %): Mg: 2.0–3.5, Ca: 2.5–4.5, Sr: 13.0–16.0, Ba: 22.0–25.0, Al: 4.5–6.0, K: 0.1–0.3, P: 9.0–12.0, O: 17.0–20.0 and F: 20.0–23.0, the F/P ratio lying between 1.8 and 2.4 and the sum of the alkaline earths between 39.5 and 49. The new glasses are melted from a material having the following initial composition (in wt. %): $Ca(PO_3)_2$: 1.0–2.5, $Ba(PO_3)_2$: 23.0–25.5, $Al(PO_3)_3$: 12.0–14.5, $MgF_2$: 6.5–8.5, $CaF_2$: 5.5–8.0, $SrF_2$: 16.0–19.0, $AlF_3$: 10.0–12.5, SrO: 2.0–3.0, BaO: 12.5–14.5 and $K_2TiF_6$: 0.2–0.7, the alkaline earth fluorides content lying between 28.0 and 35.5 and the total content of all fluorides used between 38.2 and 48.7.

5 Claims, No Drawings

OPTICAL FLUOROPHOSPHATE GLASS WITH ANOMALOUS POSITIVE INCREMENTAL DISPERSION AND PROCESS FOR MAKING IT

The application relates to an optical fluorophosphate glass having anomalous positive partial dispersion, in which the tendency toward crystallization is extremely low.

An optical glass based on metaphosphates and fluorides of alkaline-earth metals and aluminum with the following composition is already known:

| | |
|---|---|
| Ca(PO₃)₂: | 2.53% by weight |
| Ba(PO₃)₂: | 18.01% by weight |
| Al(PO₃)₃: | 22.94% by weight |
| MgF₂: | 9.70% by weight |
| CaF₂: | 7.40% by weight |
| SrF₂: | 21.80% by weight |
| AlF₃: | 6.69% by weight |
| BaO: | 9.93% by weight |
| KHF₂: | 1.00% by weight |

The elemental composition of this known glass is as follows (in weight-%):
Mg: 3.78; Ca: 4.31; Sr: 15.20; Ba: 17.29; Al: 4.49; K: 0.50; P: 12.66; O: 20.62 and F: 21.15.

This known glass has a refractive index $n_e$ of 1.544 and an Abbe number $v_e$ of 73.1. However, melting is only possible with great technological difficulty. The yield is extremely low, due, inter alia, to the high tendency of this glass towards crystallization.

It is therefore an object of the present invention to provide a glass with analogous optical properties, i.e. with an identical refractive index $n_e$ and an identical Abbe number $v_e$, in which the above mentioned technological difficulties in melting are avoided. It is a further object to indicate a process for crystallization-free melting of the glass in large units.

This object is achieved according to the invention by providing a fluorophosphate optical glass produced by melting a mixture having the following composition (in % by weight):

| | |
|---|---|
| Ca(PO₃)₂ | 1.0–2.5 |
| Ba(PO₃)₂ | 23.0–25.5 |
| Al(PO₃)₃ | 12.0–14.5 |
| MgF₂ | 6.5–8.5 |
| CaF₂ | 5.5–8.0 |
| SrF₂ | 16.0–19.0 |
| AlF₃ | 10.0–12.5 |
| SrO | 2.0–3.0 |
| BaO | 12.5–14.5 |
| K₂TiF₆ | 0.2–0.7 | wherein the alkaline earth metal fluoride content is between 28 and 35.5% by weight; the total content of all fluorides is between 38.2 and 48.7% by weight, and the F/P ratio is between 1.8 and 2.4; said glass having a refractive index $n_e$ between 1.53 and 1.55, an Abbe number $v_e$ between 72.8 and 73.5, and an anomalous positive partial dispersion $\Delta v_e$ between +11.8 and +12.5.

The glasses according to the invention have the following elemental composition: (in wt. %)

TABLE 1

| | (in atom-%): | | |
|---|---|---|---|
| | Range of the invention | Preferred range | Preferred single example |
| Mg | 2.0–3.5 | 2.0–3.0 | 2.93 |
| Ca | 2.4–4.5 | 3.0–4.0 | 3.88 |
| Sr | 13.0–16.0 | 14.0–15.0 | 14.51 |
| Ba | 22.0–25.0 | 23.0–24.0 | 23.55 |
| Al | 4.5–6.0 | 5.0–6.0 | 5.05 |
| K | 0.1–0.3 | 0.1–0.2 | 0.16 |
| P | 9.0–12.0 | 10.0–11.0 | 10.51 |
| O | 17.0–20.0 | 18.0–19.0 | 18.14 |
| F | 20.0–23.0 | 21.0–22.0 | 21.27 |
| $n_e$ | 1.53–1.55 | 1.54–1.55 | 1.544 |
| $v_e$ | 72.8–73.5 | 73.0–73.2 | 73.10 |
| $\Delta v_e$ | 11.8–12.5 | 12.1–12.2 | 12.17 |

In Table 2 below, the ranges of the invention are indicated for the initial compositions: (in wt. %)

TABLE 2

| | (in % by weight): | | |
|---|---|---|---|
| | Range of the invention | Preferred interval of the invention | Preferred individual example |
| Ca(PO₃)₂ | 1.0–2.5 | 1.6–1.8 | 1.7 |
| Ba(PO₃)₂ | 23.0–25.5 | 24.0–25.0 | 24.2 |
| Al(PO₃)₃ | 12.0–14.5 | 13.0–14.0 | 13.9 |
| MgF₂ | 6.5–8.5 | 7.0–8.0 | 7.5 |
| CaF₂ | 5.5–8.0 | 6.0–7.0 | 6.9 |
| SrF₂ | 16.0–19.0 | 17.0–18.0 | 17.9 |
| AlF₃ | 10.0–12.5 | 11.0–12.0 | 11.3 |
| SrO | 2.0–3.0 | 2.3–2.5 | 2.4 |
| BaO | 12.5–14.5 | 13.0–14.0 | 13.7 |
| K₂TiF₆ | 0.2–0.7 | 0.4–0.6 | 0.5 |

The initial quantity is molten in a manner known per se in a platinum crucible. The glass molten from the initial quantity is colorless, ream-free, stable to crystallization and can be produced in significantly higher yield than the known glass. After slow cooling, the individual example shown has the following optical data:

$n_e = 1.544$
$v_e = 73.10$
$\theta'_g = 0.4804$
$+\Delta v_e = 12.17$

The symbols here have the following meanings:
$n_e$ = refractive index
$v_e$ = Abbe number (reciprocal of the dispersion)
$\theta'_g$ = (actual) anomalous partial dispersion, where the following applies:

$$\theta'_g = \frac{n_g - n_F}{n_F - n_C}$$

In this equation, the subscripts have the following meanings:
g = blue mercury line (435.84 nm);
F' = blue cadmium line (479.99 nm);
C' = red cadmium line (643.85 nm);
$+\Delta v_e$ = positive deviation from the so-called "standard straight line", as shown in diagrammatic form and described in greater detail in, for example, the drawing of German Patent 1,496,563 and corresponding U.S. Pat. No. 3,451,829. This difference is known as the "positive anomalous partial dispersion value".

The glass obtained has the transmission characteristics shown in Table 3 below:

TABLE 3

| λ[nm] | τᵢ[5nm] | τᵢ[25nm] |
|---|---|---|
| 1014.0 | 0.998 | 0.990 |
| 700 | 0.999 | 0.995 |
| 660 | 0.999 | 0.995 |
| 620 | 0.999 | 0.995 |
| 580 | 0.998 | 0.993 |
| 546.1 | 0.999 | 0.997 |
| 500 | 0.997 | 0.988 |
| 460 | 0.996 | 0.983 |
| 435.8 | 0.994 | 0.973 |
| 420 | 0.993 | 0.968 |
| 404.7 | 0.992 | 0.963 |
| 400 | 0.991 | 0.958 |
| 390 | 0.989 | 0.948 |
| 380 | 0.985 | 0.927 |
| 370 | 0.976 | 0.884 |
| 365 | 0.963 | 0.829 |
| 350 | 0.883 | 0.537 |
| 334.1 | 0.612 | 0.086 |
| 320 | 0.158 | — |
| 310 | 0.045 | — |

In this table, the symbols have the following meanings:

λ: the measurement wavelength used [nm];

$\tau_i$ (5 mm): the net transmittance of a glass plate of thickness 5 mm;

$\tau_i$ (25 mm): the net transmittance of a glass plate of thickness 25 mm.

Further physico-chemical properties of the glass obtained are shown below:

linear thermal expansion coefficient: $\alpha_{20/300°}$ $c. = 13.43 \cdot 10^{-6}/K$;

Transformation temperature $T_g = 502°$ C.;

Density $\rho = 3.64$ g/cm³;

Knoop hardness HK = 408.

The glass according to the invention can be press-molded and is low-fluorescence and can be used for highly corrected objectives.

We claim:

1. Optical fluorophosphate glass produced by melting a mixture having the following composition (in % by weight):

| | |
|---|---|
| Ca(PO₃)₂ | 1.0–2.5 |
| Ba(PO₃)₂ | 23.0–25.5 |
| Al(PO₃)₃ | 12.0–14.5 |
| MgF₂ | 6.5–8.5 |
| CaF₂ | 5.5–8.0 |
| SrF₂ | 16.0–19.0 |
| AlF₃ | 10.0–12.5 |
| SrO | 2.0–3.0 |
| BaO | 12.5–14.5 |
| K₂TiF₆ | 0.2–0.7 | wherein the alkaline earth metal fluoride content is between 28 and 35.5% by weight; the total content of all fluorides is between 38.2 and 48.7% by weight, and the F/P ratio is between 1.8 and 2.4; said glass having a refractive index $n_e$ between 1.53 and 1.55, an Abbe number $\nu_e$ between 72.8 and 73.5, and an anomalous positive partial dispersion $\Delta\nu_e$ between +11.8 and +12.5.

2. Glass according to claim 1, wherein said glass is produced by melting a mixture having the following composition (in % by weight):

| | |
|---|---|
| Ca(PO₃)₂ | 1.6–1.8 |
| Ba(PO₃)₂ | 24.0–25.0 |
| Al(PO₃)₃ | 13.0–14.0 |
| MgF₂ | 7.0–8.0 |
| CaF₂ | 6.0–7.0 |
| SrF₂ | 17.0–18.0 |
| AlF₃ | 11.0–12.0 |
| SrO | 2.3–2.5 |
| BaO | 13.0–14.0 |
| K₂TiF₆ | 0.4–0.6 | wherein the alkaline earth metal fluoride content is between 30 and 33% by weight; the total content of all fluorides is between 41.4 and 45.6% by weight, and the F/P ratio is between 1.9 and 2.2; said glass having a refractive index $n_e$ between 1.54 and 1.55, an Abbe number $\nu_e$ between 73.0 and 73.2, and an anomalous positive partial dispersion $\Delta\nu_e$ between +12.1 and +12.2.

3. Glass according to claim 2, wherein said glass is produced by melting a mixture having the following composition (in % by weight):

| | |
|---|---|
| Ca(PO₃)₂ | 1.7 |
| Ba(PO₃)₂ | 24.2 |
| Al(PO₃)₃ | 13.9 |
| MgF₂ | 7.5 |
| CaF₂ | 6.9 |
| SrF₂ | 17.9 |
| AlF₃ | 11.3 |
| SrO | 2.4 |
| BaO | 13.7 |
| K₂TiF₆ | 0.5 | wherein the alkaline earth metal fluoride content is 32.3% by weight; the total content of all fluorides is 44.1% by weight; and the F/P ratio is 2.0; said glass having a refractive index $n_e$ of 1.544, an Abbe number $\nu_e$ of 73.1, and an anomalous positive partial dispersion $\Delta\nu_e$ of +12.17.

4. Glass according to claim 3, wherein said glass has the following elemental composition (in % by weight):

| | |
|---|---|
| Mg | 2.93 |
| Ca | 3.88 |
| Sr | 14.51 |
| Ba | 23.55 |
| Al | 5.05 |
| K | 0.16 |
| P | 10.51 |
| O | 18.14 |
| F | 21.27. |

5. Glass according to claim 4 having a linear thermal expansion coefficient $\alpha_{20/300°}$ $c.$ of $13.43 \cdot 10^{-6}/K$, a transformation temperature $T_g$ of 502° C., a density of 3.64 g/cm³, and a Knoop Hardness HK of 408.

* * * * *